Figure 1:
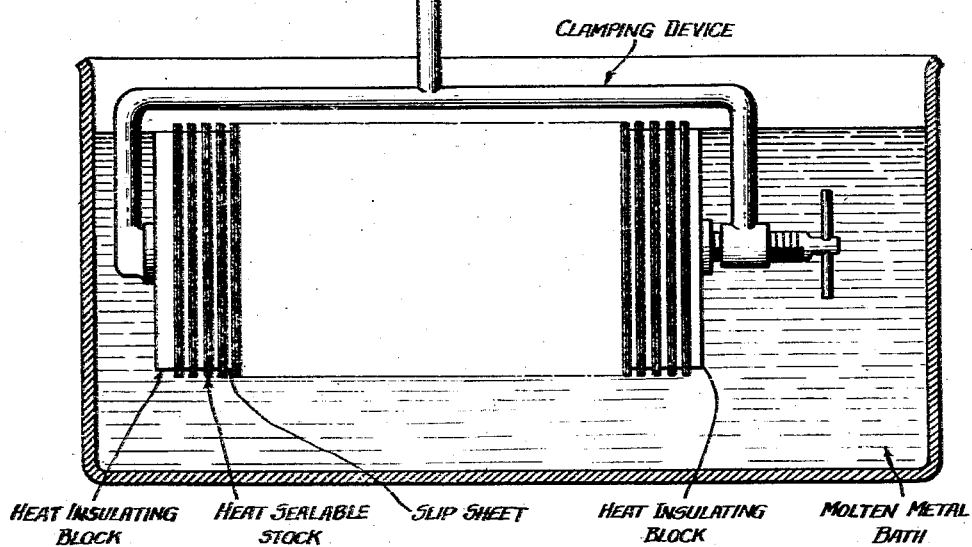

Feb. 6, 1945.   O. J. DE SYLVA   2,368,645
LIQUID SEALING METHOD
Filed Feb. 20, 1942

CLAMPING DEVICE

HEAT INSULATING BLOCK   HEAT SEALABLE STOCK   SLIP SHEET   HEAT INSULATING BLOCK   MOLTEN METAL BATH

FILLING OPENING
LEVEL OF SUBMERGENCE
MARGINAL HEAT SEAL

INVENTOR.
Oscar J. De Sylva,
BY
Cromwell, Greist, Warden & Butler
ATTYS.

Patented Feb. 6, 1945

2,368,645

UNITED STATES PATENT OFFICE 2,368,645

LIQUID SEALING METHOD

Oscar J. De Sylva, Mount Vernon, Ohio, assignor to Shellmar Products Company, Mount Vernon, Ohio, a corporation of Delaware Application February 20, 1942, Serial No. 431,651

10 Claims. (Cl. 93—35)

This invention relates to the fabrication of thermoplastic type materials and, more particularly, it pertains to an improved method of heat-sealing such materials by immersing them in a bath of a suitable pre-heated substance, such as, for example, molten metal, until the desired seal is obtained.

The present invention is an improvement over United States Letters Patent No. 2,232,062 issued to Gurwick for Fabrication of sheet material. Briefly, that patent illustrates the deposit of lines of pigmented lacquer to the marginal underside and at transverse intervals along a web of rubber hydrochloride material of the type known as "Pliofilm," thereafter bringing it together with a web of similar material, subsequently cutting the two into blanks and stacking them in units in aligned relationship. The pigmented lacquer functions as insulating areas against the application of heat to the material. Having stacked a large number of sheet units together, the adjacent edges of the sheets are simultaneously sealed together by the application of heat by means of a hot plate, the sheet units being firmly separated from each other because of the pigmented line of lacquer or, as elsewhere disclosed in this patent, by sheets of paper which prevent one unit from being firmly bonded to the sheets of an adjacent unit. The pigmented marginal line of lacquer is deposited by means of an intaglio printing unit having an etched printing cylinder which revolves in a bath and a conventional doctor blade removes excess material from the etched cylinder so that only a required amount is deposited. It should be noted that various designs of regular or irregular contours can thus be printed with the pigmented lacquer ink and subsequently be cut into blank forms by a suitable die-cutting mechanism and this is within the contemplation of the present invention. Gurwick points out in his specification that while rectangular container units have been shown, the method is quite well adapted to the production of containers of odd shapes. What is apparently intended is that his bulk sealing method is particularly well adapted to produce containers of triangular, circular or other shapes, but the manner in which very irregularly shaped materials can have their marginal portions simultaneously sealed is not therein discussed.

A principal object of the present invention is the provision of a method for heat-sealing paired marginal edges of irregularly shaped thermoplastic materials regardless of contour and to unite such sheets into any desired type of article as well as into suitable containers.

Another object of the invention is the provision of a method which will permit the simultaneous sealing of the marginal edge portions of regular as well as irregularly shaped pairs of blanks of material by immersing the same in any suitably type of pre-heated liquid.

More specifically, it is an object of the present invention to fabricate containers or bags of thermoplastic materials whether laminated to sheets of non-thermoplastic material or otherwise and to stack grouped pairs of such materials and after die-cutting the same to any desired shape or contour immersing the same while under compression in a bath of molten metal thermoplastically to heat-seal the desired marginal portion thereof.

Other specific objects of the invention are to provide for the manufacture of heat-sealable blanks of materials to form the same into articles or containers in a manner which will prove speedy and efficient, which will provide a uniform and positive seal by accelerated means while maintaining the blanks under compression to eliminate trapped air, and by substantially eliminating scorching or burning of such materials by maintaining a simultaneous and uniform contact to provide marginal penetration and fusion of the exposed areas thereof.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the application of which will be indicated in the claims.

Figure 2:
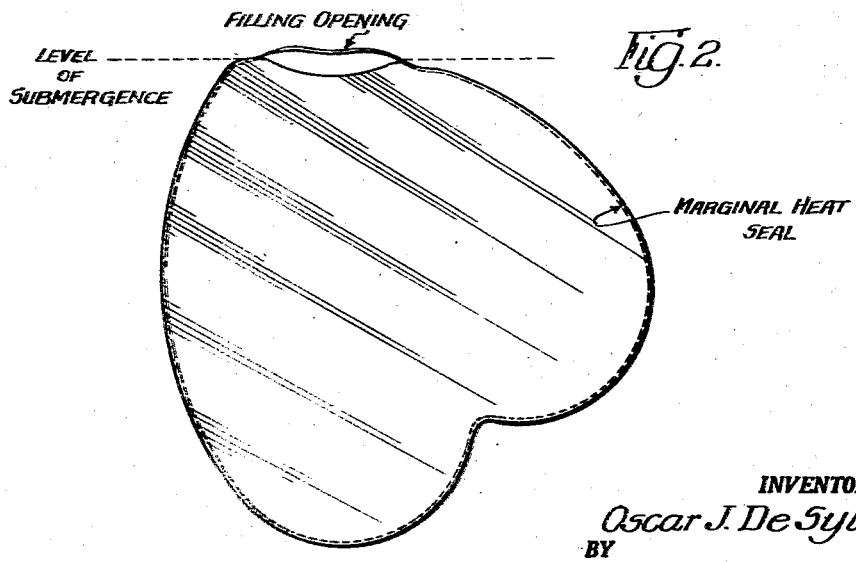

For a fuller understanding of the nature and objects of the invention reference should be had to the following detailed description taken in connection with the accompanying drawing, in which:

Fig. 1 is an elevational view, in section, illustrating one form of means for practicing the method embodying the present invention; and Fig. 2 is a plan view of two sheets of material marginally heat-sealed together, except in one area thereof leaving a filling opening, to provide an irregularly shaped container.

Generally, the present invention contemplates the utilization of certain of the steps in the preparation of blanks of material somewhat along the lines disclosed in the brief analysis of the aforementioned patent. For example, insulating lines of pigmented lacquer may be applied to the lower portion of the web before being formed into units with other similar or dissimilar webs of material in various designs of angular or curved irregular contour and die-cut accordingly. It is significant that any of these cut-out designs when stacked and properly compressed can be heat-sealed by means of the present invention.

Referring more particularly to the steps of the present invention, it will be seen that where plain Pliofilm, for example, is to be sealed, alternate double layers of film are preferably slip-sheeted with single sheets of any suitable paper stock. This paper acts as a separator or insulator to prevent blocking of the edges of the Pliofilm while it is under the heat treatment. Of course, where it is desired to seal dissimilar sheets of laminated stock no separate sheet of paper is required if the outer ply of the lamination consists of a non-conducting, non-heat-sealing material. Again, as above indicated, where at least marginal portions of the blanks, regardless of contour, have applied thereto the pigmented or other suitable non-thermoplastic lacquer to act as insulating areas, the paper slip-sheets may also be dispensed with.

After alternate layers or sheets of the materials as above indicated have been jogged or straightened, they are then stacked and flat or die-cut in any suitable manner. A large stack is then formed at the ends of which are placed heat-insulating blocks of the same shape or outline as the cut sheets or blanks. A suitable clamping device is then brought to bear in opposed relationship against opposite ends of the bundle or stacks and pulled tight. The clamp should be strong enough to exert considerable pressure upon the stack in order to eliminate trapped air, provide for a more uniform seal and eliminate the possibility of seepage of the liquid or molten metal in which the stack is to be dipped. The exposed edges of the clamped stack of material are then preferably dusted with a mineral inert powder such as talc or calcium carbonate in order to reduce adhesion of the hot metal to the sides or edges of the bundle of stock. Under suitable pressure the stock is then forced into a molten metal bath up to the lip or open end of the bag or pouch and held there for the required length of time. In this manner the desired marginal edge fusion and penetration can readily be controlled. The time within which the dipping or immersion lasts will vary for different combinations of stock as well as the depth of marginal penetration it is desired to obtain. As an example, in order to seal Pliofilm to itself, a working temperature for the molten metal in the neighborhood of about 330° F. will obtain the desired fusion and marginal penetration at about a 45 second exposure to the hot metal. Under such conditions a seal of approximately $\frac{3}{32}$ of an inch in marginal depth is produced. After this time interval has elapsed and the sought-after result has been obtained the compressed or clamped together stack of materials is removed from the bath of molten metal and the sides may be cleaned or scrubbed if this is necessary with a wire bush to remove whatever metal might adhere to the edges. The clamp may be left on for any suitable length of time depending upon the nature of the material which is being operated upon, whereupon the stock is allowed to cool to permit the sealed Pliofilm to lose its tack at the edges. Any suitable heat-sealable material or any other material treated in a manner which will react similarly is contemplated as coming within the operative range of the present invention.

The present invention has many advantages, particularly with respect to the unlimited number of oddly shaped or contoured materials which can be sealed without difficulty. Other advantages are that positive sealing may readily be accomplished and the danger of unbalanced sealing is eliminated. That is, the hot molten metal is caused to touch all points of the exposed surfaces uniformly. By the hot plate method all of the edges of the stock must first be placed flush with the plate surface and under equal pressure so that heat will be absorbed at the same rate at all points. Great caution is therefore required and consequently rigid inspection of the sealed stock is necessarily practiced at all times. If any of the stock is rejected because of improper seals it must be returned to the plate and re-sealed and additional skill and caution must be exercised less the edges become overheated and scorched. These dangers are entirely eliminated by means of the present liquid-sealing method. Another advantage of the present method is that the sealing operation is accelerated to a great degree. Tests have demonstrated that the time required for handling and sealing the materials can be reduced as much as 75 per cent over other methods as all marginal edges are sealed simultaneously. Furthermore, it is significant that no time need be lost in exact aligning of the edges of the stock inasmuch as the hot metal takes up whatever slight irregularities occur.

The process permits irregular or curved shapes to be sealed simultaneously because the liquid metal contacts all points along the perimeter of the film. Of special significance is the fact that an excellent seal is secured because trapped air at the edges between the plies is greatly expanded by the hot metal and quickly dissipated from the bath. With the hot-plate method of sealing the seal is developed partly through conduction or direct transfer of heat from the plate to the film and partly through the transfer of heat from the heated air that rises from the surface of the plate. By the present invention scorching or burning of the edges of the material is minimized because the time element to effect a good seal is reduced approximately 20 per cent as has also been demonstrated. The reason for this is the intimate contact between the liquid metal and the material being operated upon. The fact that a considerable amount of pressure is applied through the clamping means also results in an excellent seal. The clamp also reduces creeping of the films along the edges when the material is under treatment and during the process of cooling, in addition to preventing or eliminating seepage of molten metal between the plies of the stack.

While the present invention contemplates the use of any type of liquid suitable for practicing the present heat-sealing method, it has been found that metals or alloys thus far are most desirable. Any alloy, for example, which can provide a melting point in the neighborhood of about 300° to 350° or as high as 400° F. is suitable in practicing the invention. Additional tests have also been made using varying proportions of tin and lead, for example, as the heat transfer medium. In one case 60 parts of tin and 32 parts of lead melting at about 365° F. gave very satisfactory results within certain limits. It became apparent on various demonstrations that the lower working temperature alloys were best suited to give the method greater flexibility and adaptability to various types of work. Tests were also made using mercury as the transfer medium and excellent seals were secured as a result. In selecting any metal, however, care should be taken that sublimation does not take place at working temperatures. It is also best to avoid choosing metals which might give a slight chemical reaction on the surface of the bath. Obviously, the cost of the metal chosen as well as physiological hazards must be taken into account. With any metals, however, there is always the possibility that small amounts thereof will adhere to the edges of the treated material when the same is removed from the bath. This tendency of the metal to adhere, however, can be substantially eliminated by dusting with any suitable mineral powder before dipping as above indicated. In the event, however, that some metal does adhere to the treated material, it may be readily brushed off before the stack is passed on for final inspection. With respect to any physiological hazards which might be encountered, it is recommended that they can be substantially eliminated by placing a hood over the metal bath or by applying some other means for the withdrawal of fumes.

It will thus be seen that the objects hereinbefore set forth may be readily and efficiently attained and since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A method of the character described, which comprises stacking a plurality of blanks of thermoplastic material in superposed relation under compression, and immersing them in a suitable preheated liquid the boiling point of which can be maintained at a temperature which is at least slightly in excess of the fusing point of said thermoplastic material to fuse desired marginal portions together.

2. A method of the character described, which comprises stacking a plurality of blanks of thermoplastic material in superposed relation and immersing said blanks in a suitable molten metal to fuse marginal edge portions together.

3. A method of the character described, which comprises stacking a plurality of blanks of thermoplastic material in superposed relation and immersing said blanks in a suitable molten metal raised to appropriate temperature, and maintaining said blanks so immersed until fusion of a desirable marginal penetration occurs.

4. A method of fabricating containers, which comprises stacking irregularly shaped pairs of blanks of thermoplastic material in insulated relationship with respect to each other except for free marginal edges of said material and immersing said stacked blanks in a suitable pre-heated liquid the boiling point of which can be maintained at a temperature which is at least slightly in excess of the fusing point of said thermoplastic material to fuse desired marginal edges of each of said pairs of blanks.

5. A method of fabricating containers, which comprises alternately and uniformly stacking blanks of heat-sealable materials under compression, one of which consists of a sheet of heat-sealable material laminated to a sheet of non-heat-sealable material, and immersing said blanks in a suitable pre-heated liquid the boiling point of which can be maintained at a temperature which is at least slightly in excess of the fusing point of said thermoplastic material to fuse desired marginal edges of opposed heat-sealable materials.

6. A method of fabricating containers, which comprises stacking blanks of material, each of which consists of a sheet of thermoplastic material laminated to a sheet of non-thermoplastic material, and so stacking said blank as to bring the thermoplastic surfaces in face-to-face relationship under compression, and immersing said stack of blanks in a bath of suitable preheated liquid the boiling point of which can be maintained at a temperature which is at least slightly in excess of the fusing point of said thermoplastic material to fuse desired marginal edges of said thermoplastic sheets.

7. A method of fabricating containers, which comprises stacking pairs of blanks of rubber hydrochloride material, each of said pairs being suitably insulated from each other, placing said stack under compression, and dipping and holding said stack in a bath of molten metal to fuse desired marginal areas of each of said pairs of blanks to form containers.

8. A method of fabricating containers, which comprises stacking pairs of blanks of rubber hydrochloride material, each of said pairs being suitably insulated from each other, cutting a plurality of pairs to any desired shape, placing said cut pairs under compression, and immersing said compressed pairs in a bath of molten metal to fuse desired marginal areas of each of said pairs of blanks to form containers.

9. A method of fabricating containers, which comprises stacking pairs of blanks of rubber hydrochloride material, each of said pairs being suitably insulated from each other, cutting a plurality of pairs of said blanks to any desired shape, placing said cut pairs under compression, dusting exposed areas of said compressed blanks with a suitable mineral inert powder, and immersing the same in a bath of molten metal to fuse desired marginal areas of each of said pairs of blanks to form containers.

10. A method of fabricating containers, which comprises stacking pairs of blanks of rubber hydrochloride material with each of said pairs being separated by a sheet of non-fusible material, die-cutting a plurality of pairs of said blanks to any desired contour, placing said cut pairs of blanks under compression, dusting exposed areas of said compressed blanks with a suitable mineral inert powder, immersing said stack of compressed pairs of blanks in a bath of molten metal to fuse desired marginal areas, and allowing said stacks to cool and cure for a period of time to prevent contraction of said material upon release of said compression.

OSCAR J. DE SYLVA.